United States Patent [19]

Arai et al.

[11] Patent Number: 5,283,117
[45] Date of Patent: Feb. 1, 1994

[54] LAMINATE AND SELF-ADHESIVE TAPE

[75] Inventors: Yosuke Arai; Yuichi Oki; Eiji Maemura, all of Himeji; Keisuke Funaki, Ichihara, all of Japan

[73] Assignee: Idemitsu Petrochemical Co., Ltd., Tokyo, Japan

[21] Appl. No.: 817,366

[22] Filed: Jan. 6, 1992

[30] Foreign Application Priority Data

Jan. 10, 1991 [JP] Japan ................... 3-012428

[51] Int. Cl.$^5$ ................................ B32B 7/12
[52] U.S. Cl. ................... 428/343; 428/355; 428/356; 428/216
[58] Field of Search ............ 428/343, 356, 355

[56] References Cited

U.S. PATENT DOCUMENTS

| | | | |
|---|---|---|---|
| 4,393,080 | 7/1983 | Pawelohak et al. | 428/355 |
| 4,447,485 | 5/1984 | Aritake | 428/144 |
| 4,673,611 | 6/1987 | Crass et al. | 428/215 |
| 4,680,353 | 7/1987 | Ishihara et al. | 526/160 |
| 4,693,920 | 8/1987 | Agarwal et al. | 428/40 |
| 4,758,396 | 7/1988 | Crass et al. | 264/145 |
| 4,837,070 | 6/1989 | Weber et al. | 428/172 |
| 4,997,709 | 3/1991 | Huddleston et al. | 428/344 |
| 5,073,455 | 12/1991 | Nose et al. | 428/411.1 |
| 5,089,353 | 2/1992 | Negi et al. | 428/518 |

FOREIGN PATENT DOCUMENTS 0363895 4/1990 European Pat. Off. .

OTHER PUBLICATIONS

Patent Abstracts of Japan, vol. 014, No. 418, (M-1022), Sep. 10, 1990, & JP-A-02 162 038, Jun. 21, 1990.
A. Yaguchi, et al., "Styrene Resin Composite Material and Manufacture Thereof".

Primary Examiner—George F. Lesmes
Assistant Examiner—Blaine Copenheaver
Attorney, Agent, or Firm—Oblon, Spivak, McClelland, Maier & Neustadt

[57] ABSTRACT

There are disclosed a laminate comprising (a) a biaxially oriented film of a styrenic polymer having a high degree of syndiotactic configuration of 10 to 100 μm in thickness and (b) a rubber-based self-adhesive layer of 5 to m in thickness and a self-adhesive tape comprising the above-mentioned laminate. The above laminate and self-adhesive tape are excellent in transparency, heat resistance, water resistance, moisture resistance, dispenser and hand cuttability, insulating properties and mechanical properties such as elasticity and nerve and can find a wide range of effective application.

12 Claims, No Drawings

LAMINATE AND SELF-ADHESIVE TAPE

BACKGROUND OF THE INVENTION

1. Field of the Invention

The present invention relates to a laminate and a self-adhesive tape. More particularly, it pertains to a laminate excellent in cut-off property, nerve and water resistance over a wide range from low to high humidity and a self-adhesive tape comprising the same.

2. Description of the Related Arts

There has heretofore been widely used a cellophane tape as a simplified packaging self-adhesive tape, which is a laminate consisting of a cellophane film and self-adhesive and is excellent in the balanced properties including transparency, cut-off property, strength, nerve and the like. Investigation has been made on the applicability of such material as polyethylene terephthalate (PET), high density polyethylene (HDPE), polypropylene (PP) or the like to the base film of a simplified packaging self-adhesive tape. However, any of the above-mentioned materials has not yet been put to practical use because of insufficient cut-off property.

Meanwhile, a cellophane film suffers various disadvantages such as low productivity due to wet production process accompanied by the use of a large amount of detrimental chemicals and remarkable change in physical properties due to moisture causing difficulty in handling in the course of production and the like. Consequently, a cellophane tape produced from the aforestated cellophane film also suffers the drawbacks such as considerable hygroscopicity under a high humidity causing deformation likened to a telescopic pipe or the so-called "bamboo shoot"; runout of the self-adhesive from the side of the tape resulting in sticking together of the tape; poor water resistance leading to unsuitableness in the water-wetted application; worsened hand cuttability of moistened tape; and the like, leaving various problems still unsolved.

In view of the above, intensive research and investigation were made by the present inventors on the applicability of various films and self-adhesives produced by melt-forming. As a result, it has been found that a novel laminate comprising the combination of a biaxially oriented film of a styrenic polymer having syndiotactic configuration and a rubber-based self-adhesive is endowed with a unique stability to moisture and cut-off property. The present invention has been accomplished on the basis of the above-mentioned finding and information.

SUMMARY OF THE INVENTION

It is an object of the present invention to provide a laminate comprising (a) a biaxially oriented film of a styrenic polymer having a high degree of syndiotactic configuration or a composition containing the same, which film having a thickness of 10 to 100 μm and (b) a rubber-based self-adhesive layer of 5 to 80 μm in thickness.

It is another object of the present invention to provide a self-adhesive tape comprising said laminate.

Other objects of the present invention will be obvious from the text of the Specification hereinafter disclosed.

DESCRIPTION OF PREFERRED EMBODIMENTS

The laminate according to the present invention comprises as the indispensable component, both the layers (a) and (b). Here, (a) the biaxially oriented film is composed of a styrenic polymer having a high degree of syndiotactic configuration, which means that its stereochemical structure is of high degree of syndiotactic configuration, i.e. the stereostructure in which phenyl groups or substituted phenyl groups as side chains are located alternately at opposite directions relative to the main chain consisting of carbon-carbon bonds. Tacticity is quantitatively determined by the nuclear magnetic resonance method ($^{13}C$—NMR method) using carbon isotope. The tacticity as determined by the $^{13}C$-NMR method can be indicated in terms of proportions of structural units continuously connected to each other, i.e., a diad in which two structural units are connected to each other, a triad in which three structural units are connected to each other and a pentad in which five structural units are connected to each other. "The styrenic polymers having such a high degree of syndiotactic configuration" as mentioned in the present invention usually means polystyrene, poly(alkylstyrene), poly(halogenated styrene), poly(alkoxystyrene), poly(vinyl benzoate), hydrogenated polymers thereof, the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene), poly(propylstyrene), poly(butylstyrene) other polystyrenes are, poly(phenylstyrene) and poly(vinylstyrene) Poly(halogenated styrene) include poly(chlorosturene), poly(bromostyrene), and poly(fluorostyrene). Poly(alkoxystyrene) include poly(methoxystyrene) and poly(ethoxystyrene). Other styrenic polymers can be prepared from poly(vinylnapthalene) and poly(acenapthalene).

The most desirable styrenic polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene. (Japanese Patent Application Laid-Open No. 187708/1987).

Moreover, the comonomers that are usable in the aforementioned styrenic copolymers are exemplified by, in addition to the above-mentioned monomers usable in the styrenic polymers, olefin monomer such as ethylene, propylene, butene, hexene and octene; diolefin monomer such as butadiene and isoprene; cyclic diolefin monomer; and polar vinyl monomer such as methyl/methacrylate, maleic anhydride and acrylonitrile.

The molecular weight of the styrenic polymer to be used in the present invention is not specifically limited, but is desirably 10,000 to 3,000,000, particularly desirably 50,000 to 1,500,000 in terms of weight-average molecular weight. In the case where the weight-average molecular weight is less than 10,000, sufficient orientation is impossible to carry out. The molecular-weight distribution, that is, the broadening of molecular weight of the styrenic polymer is not specifically limited as well, but may be in a wide range. However, the ratio of weight-average molecular weight to number-average molecular weight is preferably 1.5 to 8.0. Meanwhile, the styrenic polymer with syndiotactic configuration is much superior in heat resistance to the conventional styrenic polymer with atactic configuration.

As the layer (a) of the laminate according to the present invention, the styrenic polymer having such a high degree of syndiotactic configuration may be used as such, but a composition of said styrenic polymer compounded with various additives may be also used. Examples of such additives include inorganic fine grain, antioxidant, antistatic agent, flame retardant, a resin of different type, etc., each of which may be pertinently compounded within a loading which does not impair the objective effect of the present invention.

Examples of the inorganic fine grain as mentioned above include oxides, hydroxides, sulfide, nitride, halide, carbonate, sulfate, acetate, phosphate, phosphite, organocarboxylate, silicate, titanate, borate, each of an element belonging to any of Groups IA, IIA, IVA, VIA, VIIA, VIII, IB, IIB, IIIB and IVB, hydrated compound thereof, double compound containing the above as primary component, mineral grain of natural origin, etc.

They are more specifically exemplified by compounds of Group IA element such as lithium fluoride and borax (sodium borate hydrate); compounds of Group IIA element such as magnesium carbonate, magnesium phosphate, magnesium oxide (magnesia), magnesium chloride, magnesium acetate, magnesium fluoride, magnesium titanate, magnesium silicate, magnesium silicate hydrate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, borium carbonate, barium phosphate, barium sulfate and barium phosphite; compounds of Group IVA element such as titanium dioxide (titania), titanium monoxide, titanium nitride, zirconium dioxide (zirconia) and zirconium monoxide; compounds of Group VIA element such as molybdenum dioxide, molybdenum trioxide and molybdenum sulfide; compounds of Group VIIA element such as manganese chloride and manganese acetate; compounds of Group VIII element such as cobalt chloride and cobalt acetate; compounds of Group IB element such as cuprous iodide; compounds of Group IIB element such as zinc oxide and zinc acetate; compounds of Group IIIB element such as aluminum oxide (alumina), aluminum hydroxide, aluminum fluoride and aluminosilicate (aluminum silicate, kaolin, kaolinite); compounds of Group IVB element such as silicon oxide (silica, silica gel), plumbago, carbon, graphite and glass; mineral grain of natural origin such as carnallite, caenite, mica, sericite and pyrolusite.

The average grain diameter of the inorganic fine grain to be used is not specifically limited but is desirably 0.01 to 3 μm, more desirably 0.01 to 1 μm. The content thereof in the molding is 0.001 to 1% by weight, preferably 0.005 to 1% by weight. The inorganic fine grain is incorporated in the finished molding. The method of incorporating is not limited but is exemplified by a method in which the fine grain is added to or deposited in the polymerization system in an arbitrary step and a method in which the fine grain is added in the arbitrary step of melt extrusion.

As the resin of different type which may be added to the foregoing styrenic polymer, a variety of resins are available and exemplified by styrenic polymer having atactic or isotactic configuration, polyphenylene ether, etc. The above resins are easily compatible with the aforestated styrenic polymer having syndiotactic configuration, are effective in controlling the crystallization at the time of producing a preform for orientation, improve the stretchability thereafter, facilitate the control of orientation conditions and enable the production of a film excellent in dynamical properties. In the case where a styrenic polymer having atactic and/or isotactic configuration is incorporated, the styrenic polymer having a chemical constitution same as that of a styrenic polymer having syndiotactic configuration is preferably used in an amount of 70 to 1% by weight, preferably 50 to 2% by weight based on the total weight of both the resins. The content of the compatible resin component exceeding 70% by weight is unfavorable since it impairs the heat resistance, which is one of the advantages of the syndiotactic styrenic polymer. Examples of incompatible resins which may be added to the styrenic polymer to be used in the present invention include polyolefins such as polyethylene, polypropylene, polybutene and polypentene; polyesters such as polyethylene terephthalate, polybutylene terephthalate and polyethylene naphthalate; polyamides such as nylon 6 and nylon 6,6; polythioethers such as polyphenylene sulfide; polycarbonate; polyarylate; polysulfone; polyether ether ketone; polyether sulfone; polyimide; halogenated vinylic polymer such as Teflon; acrylic polymer such as methyl methacrylate; polyvinyl alcohol, that is, all the resins other than the above-described compatible resins, and further, crosslinked resin containing the aforestated compatible resins. In the case where the foregoing incompatible resin is incorporated in the styrenic polymer with syndiotactic configuration according to the present invention in a small amount, it can be dispersed in the syndiotactic styrenic polymer just like islands in the sea because of its incompatibility. The above-mentioned result is useful in providing the orientated resin with favorable gloss or in improving surface slipperiness of the resin. The content of the incompatible resin component is desirably 50 to 2% by weight for the purpose of glossiness and 0.001 to 5% by weight for the purpose of controlling the surface property. For the resin product to be used at a higher temperature, the incompatible resin which is relatively heat resistant is preferably employed.

The layer (a) of the laminate of the present invention is the film made of the aforestated styrenic polymer or the composition containing the same, which is biaxially oriented in the range of 10 to 100 μm in thickness. There are available a variety of methods of producing the biaxially oriented film, for example, a method described hereunder: Firstly, the above-mentioned styrenic polymer or the composition containing the same as the raw material is usually extrusion molded into the preform for orientation in the form of film, sheet or tube; in the above molding, the heat-molten raw material is generally formed into a prescribed form by the use of an extruding machine, but the raw material in softened state instead of being heat molten may be formed. The usable extruding machines include a uniaxial extruding machine and biaxial extruding machine, each with or without a vent. The use of an appropriate mesh in the extruding machine can eliminate impurities and foreign matters. The shapes of the usable mesh include plate, cylinder, leaf disc and the like, which may be suitably selected. The extrusion condition is not specifically limited but may be suitably selected according to the various situations. The preferable extrusion conditions include a extrusion temperature ranging from the melting point of the raw material to the temperature 50° C. high than the degradation temperature of the same; a shear stress of $5 \times 10^6$ dyne/cm$^2$ or less; and a die of T-die, annular die or the like.

After the aforestated extrusion molding, the preform for orientation thus obtained is cooled for solidification by the use of a refrigerant such as gas, liquid, metallic roll or the like. In the case of a metallic roll being used, the application of an air knife, air chamber, touch roll or electrostatic charging is effective in preventing unevenness of thickness and waviness of the film.

The cooling solidification is effected usually at a temperature ranging from 0° C. to the temperature 30° C. higher than the glass transition point of the preform for orientation, preferably ranging from the temperature 70° C. lower than the above glass transition point to the above glass transition point. The cooling rate is suitably selected in the range of 200° to 3° C. per second.

In the present invention, the cooled and solidified preform is biaxially oriented to form films. The biaxial orientation may be carried out simultaneously in the machine direction and transverse direction or successively in the optional order, and may be effected in single stage or multistage. The draw ratio in terms of area ratio is 2 or more, preferably 3 or more. The draw ratio in the above range can produce the film having favorable physical properties such as a crystallinity of 25% or higher.

There are available a variety of orientation methods, which include the method by a tenter, roll-orientation method, bubbling method by the use of pneumatic pressure, rolling method, etc., each of which may be suitably selected or combined with another. The orientation temperature may be usually set in the range of the glass transition point of the preform to the melting point thereof. The orientation rate is generally $1 \times 10$ to $1 \times 10^5$ % per minute, preferably $1 \times 10^3$ to $1 \times 10^5$ % per minute. The oriented film obtained under the foregoing conditions is preferably subjected to heat setting when dimensional stability at elevated temperature, heat resistance or balanced strength inside the film is required according to the purpose of use. The heat setting may be performed by the conventional method, for example, by a method wherein the oriented film is maintained for 0.5 to 600 seconds at a temperature ranging from the glass transition point of the film to the melting point thereof, preferably ranging from the temperature 140° C. lower than the melting point thereof to the temperature slightly lower than the melting point thereof under the condition of tension, non-tension or limited contraction. In addition, the heat setting can be carried out twice or more under different conditions within the above-described ranges, and may be effected in an atmosphere of an inert gas such as argon gas and nitrogen gas.

The oriented film thus obtained may be further subjected to corona discharge treatment, plasma treatment, chemical treatment such as sulfonation or the like for the purpose of enhancing surface tension of the film.

Furthermore, embossing treatment or sand-blast treatment may be applied to the film to produce translucent film as required, and the film may be provided with writability.

The biaxially oriented film thus obtained has a thickness of 10 to 100 μm, preferably 10 to 80 μm. A thickness less than 10 μm results in insufficient nerve of the laminate, whereas that exceeding 100 μm causes the dispenser cuttability to be worsened.

The component (b) constituting the laminate of the present invention comprises a rubber-based self-adhesive layer of 5 to 80 μm in thickness, which is formed by a rubber as the primary component compounded therein as necessary with a tackifier, softener, filler, pigment, antioxidant, stabilizer or the like. The usable rubbers herein include natural rubber, SBR (butadiene/styrene copolymer rubber, polyisobutylene, polyacrylate, polyvinyl ether, polyvinyl isobutyl ether, polyvinyl butyral, chlorinated rubber, silicone-based rubber, fluororubber, etc. Examples of the tackifiers include rosin, rosin ester, coumarone resin, terpene resin, hydrocarbon resin, oil-soluble phenolic resin and the like. As the softener, fatty acid esters, animal oils, vegetable oils, wax, heavy distillate from petroleum oil, etc. may be used.

As hereinbefore mentioned, the rubber-based self-adhesive layer (b) of the laminate according to the present invention has a thickness of 5 to 80 μm, preferably 5 to 60 μm. A thickness of 5 μm or less raises difficulty in production thereof, whereas that exceeding 80 μm causes the base material liable to curling and the dispenser cuttability to be worsened.

The laminate of the present invention comprises as mentioned above (a) a biaxially oriented film and (b) a rubber-based self-adhesive layer each as indispensable component and can be obtained by laminating both the layers and nothing else. However, a underlay layer, back release layer or release paper may be incorporated according to the demand. As the underlay layer, these are available natural rubber, Casein, polyvinyl alcohol, polyacrylamide, vinyl methyl ether/maleic anhydride copolymer, styrenic copolymer polyphenylene ether-based copolymer, etc. The back release layer includes silicone-based compound.

There are available a variety of embodiments of laminating these layers, which may be suitably selected according to the purpose of use, for example, from (1) (a) biaxially oriented film/ (b) rubber-based self-adhesive layer, (2) (a) biaxially oriented film/ underlay layer/ (b) rubber-based self-adhesive layer, (3) back release layer/ (a) biaxially oriented film/ (b) rubber-based self-adhesive layer, (4) back release layer/ (a) biaxially oriented film/ (b) rubber-based self-adhesive layer/ underlay layer, (5) release paper (release film) layer/ (b) rubber-based self-adhesive layer/ (a) biaxially oriented film/ (b) rubber-based self-adhesive layer/ release paper (release film) layer, (6) release paper (release film) layer/ (b) rubber-based self-adhesive layer/ underlay layer/ (b) rubber-based self-adhesive layer/ release paper (release film) layer, each layer or film being laminated in the above-described order.

There are also available diverse methods of laminating each of the layers including, for example, solution method, heat calender method. Among them is the preferable solution method, wherein in the case of laminating two layers of (a) biaxially oriented film/ (b) rubber-based self-adhesive layer, a rubber, softener, filler, etc. each as the primary component are dissolved in a petroleum-based solvent or an organic solvent such as acetic acid ester and toluene; a tackifier is added to the solution; and the mixture is coated on the biaxially oriented film by the use of a knife coater, roll coater, gravure coater or the like, followed by heat drying by means of infrared rays, hot air, stem, etc.

The self-adhesive tape according to the present invention is composed of the above-mentioned laminate and characterized by the advantages that the tape is excellent in water resistance and dispenser cuttability even when humidified and at the same time, free from such troubles as the so-called "bamboo shoot" and sticking together of the tapes.

The laminate and self-adhesive tape according to the present invention are excellent in transparency, heat resistance, water resistance, moisture resistance, dispenser cuttability and insulating properties, and therefore, can find a wide range of effective use in the field of packaging, medical treatment, sealing, electrical insulation, anticorrosion, decoration, display, discrimination, paint masking and so forth.

In the following, the present invention will be described in more detail with reference to the non-limitative examples and comparative examples.

PRODUCTION EXAMPLE

Preparation of Syndiotactic Polystyrene (1) Preparation of Contact Product of Aluminum Compound and Water.

In a 500 ml glass vessel which had been purged with argon were placed 200 ml of toluene, 23.1 g (95 mmol) of copper sulfate pentahydrate ($CuSO_4 \cdot 5H_2$) and 24 ml (250 mmol) of trimethylaluminum, which were then reacted at 30° C. for 30 hours. Then, the solids were separated from the reaction mixture and the volatile matter was distilled away from the solution as obtained above under reduced pressure to produce 7.04 g of a contact product. The molecular weight thereof as determined by the freezing point depression method was 1100.

(2) Preparation of Styrenic Polymer

In a 500 ml glass container equipped with a stirrer were placed 50 ml of toluene and the contact product as obtained in the preceding step (1) in an amount of 3 mmol in terms of aluminum atom. To the above mixture were further added 3 mmol of triisobutylaluminum, 0.06 mmol of pentamethylcyclopentadienyltrimethyltitanium, and 200 ml of styrene to proceed with polymerization reaction at 70° C. for 1 hour. After the completion of reaction, the reaction product was washed with methanol and dried to afford 36.1 g of polymer. The polymer thus obtained had a weight-average molecular weight of 400,000 and a number-average molecular weight of 200,000.

It was proved that the polymer was polystyrene having a syndiotacticity of 97% in terms of racemic pentad, aluminum content of 4,500 ppm and titanium content of 8 ppm from the results of melting point measurement and $^{13}$C-NMR analysis.

EXAMPLE 1

The powdery styrenic polymer obtained in the above production example was subjected to vacuum drying with stirring at 150° C. for 2 hours. The dried powder was melt extruded with a uniaxial extruding machine equipped with a vent and a die with a plurality of capillaries at the end thereof, cooled and cut off to produce raw material for extrusion molding in the form of pellet. The above melt extrusion was carried out at a melt temperature of 300° C., screw diameter of 50 mm with full flight type, extrusion rate of 30 kg/hr and vent pressure of 10 mmHg. Subsequently, the pellet was crystallized and dried in hot air with stirring. The dried pellet thus obtained had a residual styrene monomer content of 1100 ppm and a crystallinity of 35%. Thereafter, the dried pellet was extruded at a extrusion temperature of 320° C., shear stress of $3 \times 10^5$ dyne/cm$^2$ by the use of a vibrationproof apparatus equipped with a T-die at the end of the uniaxial extruding machine to produce a melt extruded sheet.

The molten sheet thus obtained was placed closely in contact with a metallic cooling roll adjusted to 70° C. by means of electrostatic charging at a cooling rate of 50° C./sec to produce an original sheet having a thickness of 300 μm and a crystallinity of 15%. The original sheet thus obtained was successively subjected to biaxial orientation in the order of lengthwise and crosswise direction at a draw ratio of 3 each, at 110° C. and an orientation rate of 3000% per minute using a table tenter. The oriented film thus obtained was heat treated at 260° C. for 30 seconds under limited contraction to give a film having a thickness of 30 μm and a crystallinity of 55%.

Then, a self-adhesive consisting of 100 parts by weight of masticated pale crepe, 75 parts by weight of poly-βpinene; S-70, 5 parts by weight of petroleum-based softener and 2 parts by weight of polymerized trimethylhydroquinoline was applied to one side of the above-described biaxially oriented film of styrene polymer (BO-SPS) and dried to afford a laminate having a self-adhesive layer thickness of 10 μm. The properties of the laminate thus obtained are given in Table 1.

EXAMPLE 2

The procedure in Example 1 was repeated except that after the biaxial orientation, the film was heat treated at 200° C. for 30 seconds followed by post-orientation at 150° C. in lengthwise direction at a draw ratio of 1.4 to produce a base film. The properties of the laminate thus obtained are given in Table 1.

EXAMPLE 3

The procedure in Example 1 was repeated except that the self-adhesive was applied to both sides of the film. The properties of the laminate thus obtained are given in Table 1.

COMPARATIVE EXAMPLE 1

The procedure in Example 1 was repeated except that the non-oriented SPS film of 30 μm in thickness was used as the base film by adjusting the degree of opening of the T-die lip, extrusion rate and take-off speed. The properties of the laminate thus obtained are given in Table 1.

COMPARATIVE EXAMPLE 2

Properties of the cellophane tape produced by Nichiban Co., Ltd. are given in Table 1.

COMPARATIVE EXAMPLE 3

The procedure in Example 1 was repeated except that a PET film (Type "V", produced by Teijin Limited) was used as the base film in place of BO-SPS. The properties of the laminate thus obtained are given in Table 1.

COMPARATIVE EXAMPLE 4

The procedure in Example 1 was repeated except that a polypropylene film of 25 μm in thickness ("Trephan", produced by Toray Industries, Inc.) was used as the base film in place of BO-SPS. The properties of the laminate thus obtained are given in Table 1.

TABLE 1

| | Base film | | Base film properties | | | Self-adhesive layer | |
|---|---|---|---|---|---|---|---|
| | | | Modulus of elasticity (kg/mm²) | Strength (kg/mm²) | Elongation (%) | | Thickness |
| | Type | Thickness (μm) | MD/TD | MD/TD | MD/TD | Type | (μm) |
| Example 1 | BO-SPS | 30 | 390/420 | 13/15 | 40/30 | 1*³ | 10 |
| Example 2 | SPS | 26 | 600/290 | 16/8 | 20/40 | 1 | 10 |
| Example 3 | BO-SPS | 30 | 390/420 | 13/15 | 40/30 | 1 | 10/10 |
| Comparative Example 1 | BO-SPS | 30 | 270/260 | 6/5 | 3/2 | 1 | 10 |
| Comparative Example 2 | Cellophane | 30 | Cellophane (produced by Nichiban Co., Ltd.) | | | 1 | — |
| Comparative Example 3 | PET*¹ | 25 | 400/400 | 22/23 | 100/95 | 1 | 10 |
| Comparative Example 4 | PP*² | 25 | 200/400 | 14/30 | 160/60 | 1 | 10 |

| | Laminate properties | | | | |
|---|---|---|---|---|---|
| | Dispenser cuttability*⁴ | | | | Water |
| | 20° C., 40% RH | 60° C. 80% RH | Nerve*⁵ | Transparency*⁶ | resistance*⁷ |
| Example 1 | ○ | ○ | ○ | ○ | ○ |
| Example 2 | ○ | ○ | ○ | ○ | ○ |
| Example 3 | ○ | ○ | ○ | ○ | ○ |
| Comparative Example 1 | Δ | Δ | x | ○ | ○ |
| Comparative Example 2 | ○ | x | ○ | ○ | x |
| Comparative Example 3 | x | x | ○ | Δ | ○ |
| Comparative Example 4 | x | x | Δ | Δ | ○ |

*¹PET: Tetron film, Type "V", produced by Teijin Limited.
*²PP: Trephan, produced by Toray Industries, Inc.
*³1: masticated pale crepe/polypinene; S-70/petroleum-based softener/polymerized trimethylhydroquinoline = 100/75/5/2
*⁴Evaluated by cutting with a dispenser for cellophane tape.
○: good in cuttability
Δ: bad in cut line
x: difficult to cut
*⁵Evaluated by fixing one side of a cut small piece (2 cm × 10 cm).
○: comparable to cellophane
Δ: bad in nerve, depending on direction
x: bad in nerve for all directions
*⁶Evaluated by visually observing 10 sheets (2 cm × 2 cm) sticked together.
○: transparent from top to bottom
Δ: slightly opaque
*⁷Evaluated for appearance and hand cuttability after immersing in water at 60° C. for 10 minutes.
○: remain unchanged from the state before immersing
x: deformed and worsened in hand cuttability

What is claimed is:

1. An adhesive laminate which consists essentially of (a) a biaxially oriented film of a styrenic polymer having a syndiotacticity in which the proportion of racemic diad is at least 75% optionally blended with from 1 to 70% by weight of a compatible resin or with from 2 to 50% by weight of an incompatible resin, said film having a thickness of 10 to 100 μm and (b) a rubber-based self-adhesive layer having a thickness of 5 to 80 μm.

2. The adhesive laminate of claim 1, wherein said incompatible resin is a polyolefin, a polyester, a polyamide, a polythioether, a polycarbonate, a polyarylate, a polysulfone, a polyether ketone, a polyether sulfone, a polyimide, a halogenated vinylic polymer, an acrylic polymer or polyvinyl alcohol.

3. The laminate according to claim 1, wherein said (b) rubber-based self-adhesive layer is at least one rubber selected from the group consisting of natural rubber, butadiene-styrene copolymer rubber, polyisobutylene rubber, polyacrylate, polyvinyl ether, polyvinyl isobutyl ether, chlorinated rubber and silicone rubber.

4. The adhesive laminate according to claim, 1, wherein said composition comprises said styrenic polymer and at least one additive selected from the group consisting of inorganic fine grain compound, antioxidant, antistatic agent, flame retardant and other resin than styrenic polymer having syndiotactic configuration.

5. The adhesive laminate according to claim 4, wherein said other resin is compatible with styrenic polymer having syndiotactic configuration.

6. The adhesive laminate according to claim 5, wherein said other resin is selected from the group consisting of atactic styrenic polymer, isotactic styrenic polymer and polyphenylene ether.

7. The adhesive laminate according to claim 4, wherein said other resin is incompatible with styrenic polymer having syndiotactic configuration.

8. The adhesive laminate according to claim 1, wherein said (b) rubber-based self-adhesive layer comprises a rubber as the primary ingredient and at least additive selected from the group consisting of tackifier, softener, filler, pigment, antioxidant and stabilizer.

9. The adhesive laminate according to claim 1, further comprising at best one layer selected from the group consisting of underlay layer, back release layer and release paper in addition to said (a) film and said (b) layer.

10. The adhesive laminate according to claim 1, wherein said (b) layer is attached to one side of said (a) film.

11. The adhesive laminate according to claim 1, wherein said (b) layer is attached to both sides of said (a) film.

12. The adhesive laminate according to claim 1, wherein said biaxially oriented film is a heat set biaxially oriented film.

* * * * *